3,445,529
NITRATION OF HYDROCARBONS IN THE
PRESENCE OF PERFLUOROALKANE OR
PERFLUOROCHLOROALKANE
Richard D. Smetana, Beacon, N.Y., assignor to Texaco Inc., New York, N.Y., a corporation of Delaware
No Drawing. Filed June 9, 1967, Ser. No. 644,816
Int. Cl. C07c 79/02, 77/00, 77/02
U.S. Cl. 260—644                                   3 Claims

ABSTRACT OF THE DISCLOSURE

A method of nitrating alkanes and alicyclic hydrocarbons of between 2 and 50 carbons to produce nitration products comprising contacting said alkanes and alicyclic hydrocarbons in the presence of a liquid perhaloalkane selected from the group consisting of perfluoroalkane and perfluorochloroalkane of from 1 to 20 carbons with a nitrating agent selected from the group consisting of $N_2O_5$ and a $P_2O_5$—$HNO_3$—$H_2O$ combination. The liquid perhalohydrocarbon functions to enhance the conversion of the hydrocarbon reactant to nitration products and as a nitration director favoring the production of nitro derivatives. By standard hydrogenation procedures the nitroalkane and nitrocycloalkane compounds formed in the resultant nitration product can be converted to their corresponding alkyl and cycloalkyl amines and the nitrate products therein can be converted to their corresponding alkanols and cycloalkanols.

BACKGROUND OF INVENTION

Field of invention

This invention is in the field of art relating to the manufacture of compounds having the general formula:

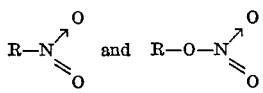

where R is a monovalent saturated aliphatic or cycloaliphatic radical (alkyl or cycloalkyl).

Description of prior art

Nitration of alkanes and cycloalkanes with dinitrogen pentoxide ($N_2O_5$) with or without the presence of solvent such as carbon tetrachloride is known. Although these prior $N_2O_5$ methods produced nitration products, the extent and rate of nitration and the production of nitro compounds vis-a-vis nitrates leave much to be desired. The importance of a nitration reaction favoring the production of nitro compounds as opposed to nitrate derivatives becomes particularly significant if the intended use of the nitration product is for the production of amines via hydrogenation, since nitro compounds under hydrogenation result in amine products while the analogous nitrate compound form alcohols.

In the method of the present invention the extent and rate of nitration as well as the relative amount of nitro formations are significantly increased over many analogous past procedures.

SUMMARY OF INVENTION

This invention relates to a method of preparing nitration products in an improved quantity and rate having an increased nitro content. More particularly, my method comprises contacting in the presence of a liquid perhaloalkane of from 1 to 20 carbons selected from the group consisting of perfluoroalkane and perfluorochloroalkane, an alkane or cycloalkane of 2 to 50 carbons with a dinitrogen pentoxide prepared either outside or in situ. I have unexpectedly discovered the defined perhaloalkane in said method acts to substantially promote nitration and selectively direct the reaction to the production of increased quantity of nitro derivatives at the expense of their nitrate counterparts.

DETAILED DESCRIPTION OF THE INVENTION

In the operation of the method of the invention a hydrocarbon of from 2 to 50 carbons selected from the group consisting of alkane and alicyclic hydrocarbon is contacted in the presence of a liquid perhalohydrocarbon as heretofore defined at a temperature between about —10 and 100° C. under a pressure of between about 1 and 100 atmospheres with a nitrating agent selected from the group consisting of $N_2O_5$ and a combination of $P_2O_5$—$HNO_3$—$H_2O$, said combination having a

mole ratio of between about 1:0.5:0 and 1:10:1.9, preferably between about 1:1:0 and 1:5:1.6. Under advantageous conditions, the mole ratio of liquid perhalohydrocarbon to hydrocarbon reactant is between about 20:1 and 1:10, preferably between about 10:1 and 1:2, and the mole ratio of nitric acid ($HNO_3$) to hydrocarbon reactant is advantageously between about 10:1 and 1:10, preferably between about 2:1 and 1:5.

Under the preferred conditions, the reaction is conducted until no more than about 20% of the hydrocarbon reactant is converted into derivatives since substantially higher conversions result in material formation of undesired ketone, carboxylic acid an polyfunctional compounds. Further, the reaction is preferably conducted under conditions of agitation to facilitate contact of the reactants and at temperatures of between about 0 and 50° C.

Temperatures above 100° C. tend to favor the production of undesired by-products. Further, at temperatures below about —10° C. the rate of reaction is substantially reduced.

The nitration products are recovered by standard means such as removing the volatile reaction ingredients and by-products such as $NO_2$, $HNO_3$ and perhaloalkane (if volatile) via distillation leaving a 2-layer residue. The upper layer of said residue comprises the organic nitration products and unreacted paraffin and the lower layer the phosphorus acid by-product. The two layers may be separated by gravity separation and, if desired, nitration products sent onward to standard hydrogenation treatment. After hydrogenation the formed alcohols, amines and unreacted paraffin products can be separated from one another by standard means, e.g., via fraction distillation and acidic extraction.

In an alternative method of recovery the nitration products may be separated from the reaction mixture and one another by selective extraction and/or fractional distillation. For example, under mixing conditions subsequent to nitration the reaction mixture can be poured into ice water and the resultant aqueous and organic layers are separated from one another and the organic layer is subjected to fractional distillation. Alternatively, the nitration mixture may be poured into a mixture of water and an organic selective solvent such as ethyl ether or chloroform under conditions of agitation and after a period of agitation separating the organic layer from the aqueous layer and subjecting the organic layer to fractional distillation to recover the desired alkyl and cycloalkyl nitrates and nitroalkane products and also solvent for reuse.

The nitrating $P_2O_5$—$HNO_3$—$H_2O$ combination as defined represents a mixture of $HNO_3$ and $P_2O_5$ or $HNO_3$ and the lower hydrates of $P_2O_5$ such as metaphosphoric acid ($P_2O_5/H_2O$ mole ratio=1:1). The $P_2O_5$ and hydrates thereof within the limits defined function to dehydrate the $HNO_3$ to $N_2O_5$. The higher hydrate forms of $P_2O_5$ outside the scope of the invention, i.e., where the mole ratio of $P_2O_5/H_2O$ is substantially lower than about 1:1.9, e.g., pyrophosphoric acid ($P_2O_5/H_2O$ mole ratio=1:2) and orthophosphoric acid ($P_2O_5/H_2O$ M.R.=1:3) do not significantly dehydrate the $HNO_3$, and therefore, under the conditions of the invention no significant nitration takes place when said higher hydrated forms are employed. Further, the most preferred species of the nitrating agent combination is anhydrous, that is, when $P_2O_5/H_2O$ ratio is 1/0. As the water content of the nitrating agent combination increases, the combination's effectiveness decreases. For example, under comparable conditions of the invention method a polyphosphoric acid ($P_2O_5/H_2O$ M.R.=1:1.6)-anhydrous nitric acid combination is only 1/200 as effective as an anhydrous $P_2O_5$ ($P_2O_5/H_2O$ M.R.=1:0)-anhydrous nitric acid combination in producing nitration products.

In connection with the above water associated with nitric acid, if any, is included in the water content designation of the $P_2O_5/HNO_3/H_2O$ combination. Employment of 95-100 wt. percent nitric acid is preferred although more dilute (aqueous dilution) nitric acid, e.g., as low as 70 wt. percent may be utilized, however, with an attendant reduction in nitration product yield.

Examples of hydrocarbon reactants contemplated herein are dodecane, cyclohexane, methylcyclohexane, methylcyclopentane, isooctane and decalin.

Examples of the liquid perhaloalkane contemplated herein are 1,1,2-trichloro-1,2,2-trifluoroethane, fluorotrichloromethane, 1-perfluoro-n-heptane and perfluoro-(2,2,4-trimethylpentane).

Examples of the nitro and nitrate products produced herein are nitrododecanes, dodecyl nitrates, nitrocyclohexane, cyclohexyl nitrate, methylcyclohexyl nitrates, nitromethylcyclohexanes, isooctyl nitrates, nitroisooctanes, nitrodecalins and decalin nitrates.

The following examples further illustrate the method of the invention but are not to be construed as limitations thereof.

EXAMPLE I

To a 100 milliliter 3-necked flask fitted with a condenser, thermometer and stirrer, there was added in the following order a $P_2O_5$-nitric acid mixture, 1,1,2-trichloro-1,2,2-trifluoroethane and n-dodecane. The nitric acid employed was of 90 wt. percent concentration. The reaction mixture was vigorously stirred throughout the ingredient addition and subsequent reaction period. At the end of the reaction period the reaction mixture was poured into 70 mls. of ice water and the resultant mixture was vigorously shaken. After agitation the aqueous layer of the mixture is separated from the organic layer by gravity separation. The organic layer was washed three times with 50 mls. of ice water and dried over anhydrous calcium chloride for one hour. The 1,1,2-trichloro-1,2,2-trifluoroethane and volatile by-products were removed by rotary evaporation at 25° C. at 25 mm. Hg pressure. The organic residue was analyzed utilizing infrared spectrometry and gas chromatography.

The foregoing procedure representative of the method of the invention was employed in two runs, (A&B), one run operated at 5° C. and another run operated at 25° C. In addition three comparative runs were employed (Runs C, D and E). Comparative Runs C and D utilized the foregoing procedure but employed no perhaloalkane liquid and Run E substituted carbon tetrachloride for the perhaloalkane liquid of the invention. The test data and results are reported in the following table.

TABLE

| Run | A | B | C | D | E |
|---|---|---|---|---|---|
| Reactants: | | | | | |
| Dodecane, g | 7.7 | 7.7 | 7.7 | 7.7 | 7.7 |
| $CCl_2FCClF_2$, g | 45 | 45 | | | |
| $CCl_4$ | | | | | 48 |
| $HNO_3$, g | 19 | 19 | 19 | 19 | 19 |
| $P_2O_5$, g | 17.1 | 17.1 | 17.1 | 17.1 | 17.1 |
| $H_2O$, g | 1.9 | 1.9 | 1.9 | 1.9 | 1.9 |
| $P_2O_5/HNO_3/H_2O$, M.R. | 1/2.9/1 | 1/2.9/1 | 1/2.9/1 | 1/2.9/1 | 1/2.9/1 |
| $CCl_2FCF_2Cl$/dodecane, M.R. | 5.4 | 5.4 | | | |
| $CCl_4$/dodecane, M.R. | | | | | 6.9/1 |
| $HNO_3$/dodecane, M.R. | 6.7/1 | 6.7/1 | 6.7/1 | 6.7/1 | 6.7/1 |
| React. cond.: | | | | | |
| Time, minutes | 180 | 10 | 180 | 60 | 10 |
| Temp.,° C | 5 | 25 | 5 | 25 | 25 |
| Product yield and yield rate: | | | | | |
| Percent conversion [1] | 5.1 | 14.2 | 3.2 | 12.3 | 9.5 |
| Percent selectivity: [2] | | | | | |
| Dodecyl nitrate | 65 | 52 | | 63 | 59 |
| Nitrodecane | 30 | 43 | | 37 | 41 |
| Percent conversion | | | | | |
| React. time, minutes | 1.6 | 6.9 | 1 | 1 | 3.4 |

[1] $Conversion = \dfrac{moles\ dodecane\ consumed}{moles\ dodecane\ charged} \times 100$

[2] $Selectivity = \dfrac{moles\ of\ particular\ product}{moles\ of\ dodecane\ charged} \times 100$ M.R.=mole ratio.

As can be seen from the foregoing the method of the invention represented by Runs A and B render a higher conversion rate and nitro product yield under comparable conditions in respect to comparative Runs C, D and E which were respectively employed (1) no catalytic directive solvent (Runs C and D and (2) $CCl_4$ as a substitute for perhalohydrocarbon at 25° C. (Run E).

I claim:

1. A method of nitrating a hydrocarbon of from 2 to 50 carbons selected from the group consisting of alkane and cycloalkane comprising contacting said hydrocarbon in the presence of a liquid perhaloalkane of from 1 to 20 carbons selected from the group consisting of perfluoroalkane and perfluorochloroalkane with a nitrating agent selected from the group consisting of dinitrogen pentoxide and a $P_2O_5$—$HNO_3$—$H_2O$ combination, said combination having a $P_2O_5/HNO_3H_2O$ mole ratio of between about 1:0.5:0 and 1:10:1.9, at a temperature between about $-10$ and $100°$ C. under a pressure of between about 1 and 100 atmospheres utilizing a mole ratio of said perhaloalkane to said hydrocarbon of between about 20:1 and 1:10 in a mole ratio of $HNO_3$ to said hydrocarbon of between about 10:1 and 1:10.

2. A method in accordance with claim 1 wherein said temperature is between about $-10$ and $50°$ C., said nitrating agent is said $P_2O_5$—$HNO_3$—$H_2O$ combination of a mole ratio of between about 1:1:0 and 1:5:1.6, said perfluoroalkane to said hydrocarbon mole ratio is between about 10:1 and 1:2 and said $HNO_3$ to said hydrocarbon mole ratio is between about 2:1 and 1:5.

3. A method in accordance with claim 2 wherein said hydrocarbon is dodecane and said perhaloalkane is 1,1,2-trichloro-1,2,2-trifluoroethane.

References Cited

UNITED STATES PATENTS 3,378,596   4/1968   Toops et al. _____ 260—644

OTHER REFERENCES

Titov et al., Dokiady Akad. Nauk, USSR, vol. 81, No. 6, pp. 1085 to 1088 (1951).

LELAND A. SEBASTIAN, *Primary Examiner.*

U.S. Cl. X.R.

260—466, 467